INVENTOR.
J. G. FINLEY

BY *Young & Quigg*

ATTORNEYS

United States Patent Office 3,690,909
Patented Sept. 12, 1972

3,690,909
SUPPORTED RELEASABLE POLYOLEFIN FILMS
John G. Finley, Chicago, Ill.
(% Phillips Petroleum Co., Bartlesville, Okla. 74003)
Filed Feb. 27, 1970, Ser. No. 15,119
Int. Cl. B44d 5/00, 1/14
U.S. Cl. 117—6
9 Claims

ABSTRACT OF THE DISCLOSURE

A strippable release composition is prepared by applying a silicone-alkyd resin to a base substrate, curing the resin, and applying a polyolefin film to the cured resin layer. The film adheres sufficiently to the cured silicone-alkyd resin for further processing, such as for addition of subsequent layers. The film is readily releasable from the silicone-alkyd resin without distortion of either substrate, film, or subsequently added layers.

This invention relates to release compositions. In another aspect, it relates to methods of supporting polyolefin films. In a somewhat different aspect, it relates to the preparation of a polyolefin-film protected adhesive subassembly.

Polyolefin films make excellent protective covers for many types of adhesive subassemblies, from bandages to fly paper. The primary difficulty that has been encountered with the use of such films is bottomed in the high degree of flexibility and deformability of the films. When efforts are made to apply the films on to subassemblies, such as adhesive coated stocks and compositions, the films tend to wrinkle or otherwise deform seriously, which limits usefulness, reduces appearance, and greatly reduces the protective properties of the films toward the adhesive.

Compositions have been made wherein a polyethylene is adherently coated to a base, such as paper, and then a silicone, i.e. organosiloxane, release coated overcoated on the polyethylene. When used to protect a subassembly, this approach leaves a base paper adherently on the protective polyethylene film, reducing the usefulness of the film, and detracting from the appearance of products to which it is applied. Efforts to support a film with a base coated with an oragnosiloxane fail due to relatively weak bonds between film and organosiloxane resulting in deformation of the film in processing.

A method is needed which will adequately support the films during relatively strenuous processing while the films are applied to or united with the subassemblies, yet prevent deformation of the film. Thereafter, the support must be cleanly removable from, i.e., releasable from, the polyolefin film without causing folding, wrinkling, or other deformation of the film now on the subassembly.

My invention provides the answer for the above requirements. My invention basically involves a three-layer release composition, uniquely utilizing a cured-in-place silicone-alkyd resin as the second layer.

Many potential users of the polyolefin films have no facilities for producing the films as such, such as by extrusion and the like. Therefore, a need additionally exists for an economical stable shippable supported film. By use of my invention, the user can receive the supported film, shipped in large rolls or the like, add his own components, then strip off the support, thus leaving his own components properly and attractively coated with and protected by the polyolefin film.

Therefore, I have as one object of my invention to provide a supported polyolefin film, which film is readily releasable or strippable from the support.

An additional object is to prepare a support combination of sufficient ability to hold or retain a polyolefin film for processing, yet with a weak enough bond so that the polyolefin film is readily releasable from the support.

A further object of my invention is to provide a supported polyolefin film upon which additional materials and coatings can be laid, then the film readily released along with the other materials or coatings away from the support components.

Other aspects, objects, and the several advantages of my invention will be apparent to one skilled in the art from the following description and from my appended claims.

In the unique supported releasable polyolefin films of my invention, the first layer is a base or substrate or backing sheet, such as paper. The second layer is a cured-in-place silicone-alkyd resin composition bonded to the first layer by the curing operation. The third layer is a polyolefin film laid upon the second or cured resin layer. Optionally, a fourth layer is applied, consisting of a cured organosiloxane coat so as to provide release properties between the polyolefin film layer and the structures subsequently laid thereupon.

My invention also encompasses the application of a cured-in-place silicone-alkyd resin composition on each side of the first layer or substrate, and a polyolefin film laid upon either or even each cured resin layer. This results in a five-layered release composition, when a polyolefin film is laid upon each side, in effect a single substrate supporting, with the assistance of the cured silicone-alkyd resin layers, two separate polyolefin films. Again, optionally with a cured organosiloxane coat on the outer surface of either or both of the polyolefin film layers so as to give better release properties to any substrates laid thereupon.

My invention provides an assembly which is a well supported polyolefin film. The polyolefin film does not wrinkle, or crinkle, or otherwise deform during subsequent processing. Upon the well supported polyolefin film can be laid other layers or subassemblies such as bandage subassemblies, tire-patch compositions, electricians' tape.

My invention can be more readily observed by referring to the attached drawing, showing several figures.

Figure 1:
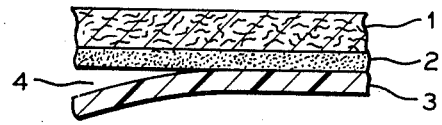
FIG. 1 illustrates the basic invention with a single polyolefin layer.

In FIG. 1, the first layer 1 shows the base or substrate or backing sheet. The next layer 2 is a curable silicone-alkyd resin which is applied to the base or substrate usually as a solution, and then cured with a catalyst by initiation and solvent remove at a suitable temperature. This provides a close tight bond of the cured silicone-alkyd resin to be substrate or support. The third layer 3 is a polyolefin film which is overcoated on to the cured silicone-alkyd resin coating. The bond between the polyolefin film and the cured resin is sufficiently strong for the entire three-layer structure to be further processed, and yet weak enough for the base plus cured scililone-alkyd resin to be readily released 4 from the polyolefin 3 at the appropriate time in the overall processing sequence. FIG. 1 shows the polyolefin film 3 partly released 4 from the resin 2 and base 1.

Figure 2:
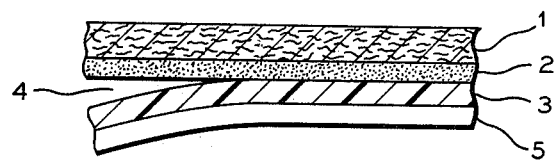
FIG. 2 is similar to FIG. 1 except showing the optional addition of a polyorganosiloxane coat as a fourth layer on the polyolefin film.

In FIG. 2, the overall strippable release composition is shown as in FIG. 1, together with the addition of the fourth layer 5 which is a cured organosiloxane coat so as to enable a subassembly subsequently laid upon the polyolefin film 3 to be readily released from the polyolefin film 3 when desired.

Figure 3:
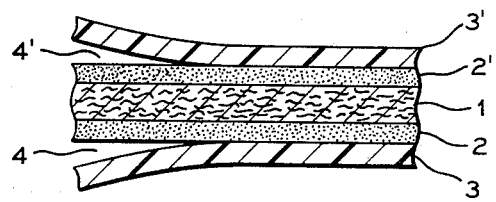
FIG. 3 shows the related structure with a single substrate supporting a dual set of polyolefin films.

In FIG. 3, the central layer of the five-layer assembly shown is the substrate 1. In this embodiment of my invention, each side of the base 1 has been overcoated with a curable silicon-alkyd resin 2 and 2', and these then have been appropriately cured so that the base is tightly bonded on each side to a cured silicon-alkyl resin layer. To each side, then, is applied a polyolefin film 3 and 3' which films can be the same on each side, or can be of a different polyolefin if desired. Each polyolefin film 3 and 3' is releasable at 4 and 4'. The drawing shows each polyolefin film 3 and 3' partly released. Optionally, of course, upon either of the polyolen films 3 and 3' could be laid the organosiloxane release coat 5 as illustrated in FIG. 2.

Figure 4:
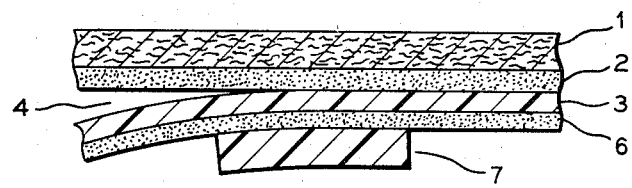
FIG. 4 illustrates an application of FIG. 1 in the preparation of a bandage assembly.

FIG. 4 demonstrates the application of the three-layer embodiment of my invention as shown in FIG. 1 to the actual production of an adhesive bandage. To the supported polyolefin film 3 is applied an adhesive 6, and to this a gauze or bandage subassembly 7. The whole then can be rolled, slit or otherwise cut to size, and the strippable portion released 4, as shown in FIG. 3, taking with it the resin, to discard. The steps can be handled in somewhat differing sequence, if desired, for example if a tacky adhesive is used. Optionally, of course, a cured organosiloxane release coat can be added onto the polyolefin film 3 before applying the adhesive 6.

In order that my composition be one that can be readily released at the cured silicone-alkyl resin versus polyolefin interface, a suitable range of release broadly will be from 1 to 50 grams per inch width at 180° pullback, with a preferred range of from 5 to 15 grams per inch width. Thus, the polyolefin film, while well supported for processing and applications of subsequent layers, is readily strippable from the supporting structure. The base and cured resin layers are together stripped or released from the polyolefin film without the need of addition of moistening or wetting agents to facilitate such release or separation.

The following are examples of actual preparation of embodiments of my invention. The examples showing a three-layer construction should be considered as illustrative and not as delimiting.

EXAMPLE I

A 78 pound-per-ream kraft paper substrate was used in this run, clay coated on one side. The substrate was overcoated in line with a curable silicone-alkyd formulation obtained as a solution from the Guardian Chemical Company, under their trademark Tufline C-73. No primer was used on the paper before coating with the silicone-alkyd.

The curable silicone-alkyd was applied to the paper side of the substrate, using a 150 quadrangular cell gravure cylinder, at the rate of 4 pounds of solution per ream, equivalent to 1.2 pounds of dry solids per ream. The solution used was a curable silicone-alkyd dissolved in toluol as diluent or dispersant, 48 weight percent solids, viscosity 700–900 cps., 7.9 pounds weight per gallon. The general types of silicone-alkyd materials useful in the application of my invention are described hereinafter in this specification.

The substrate with the coating was passed through an oven for curing and drying at a line speed of 200 feet per minute at an oven temperature of approximately 400° F. Such line speed and temperature, of course, are variable depending upon the equipment used.

The substrate with the cured resin coating was overcoated in line at the rate of 14.4 pounds per ream, equivalent to a 1 mil coating, using a low density polyethylene with a nominal density of 0.915 g./cc. and a nominal melt index of 12. The melt temperature of the polyethylene was about 600° F.

The polyethylene film stripped off readily from the overcoated substrate with a release of approximately 10 grams per inch width at 180° pull-back. This value was determined on an Amthor tensile strength tester, vertical model Type 272 light capacity tester. The tester and method are standard in the industry.

EXAMPLE II

A further three-layer composition was prepared according to my invention, using a 35 pound-per-ream glassine as the substrate, otherwise prepared as described in Example I above. Similar results were obtained and the polyolefin film was satisfactorily supported for processing. The glassine stock used was a fairly light substrate with a slight tendency to curl and tear at the edges.

EXAMPLE III

Another three-layer composition was prepared according to my invention, using a 100 mil polyester film as substrate. Otherwise the preparation was as described for Example I hereinabove. The polyester film also provided a satisfactory substrate with similar results to those obtained with other substrates as described in Examples I and II above. With a substrate film such as the polyesters, it is desirable to maintain a minimum temperature in the curing of the silicone-alkyd resin layer, since such polyester films tend to show a transverse or cross-machine directional (CMD) curl due to the heat used in the curing of the coating. Moderate temperatures or shorter drying times with faster line speeds avoid such difficulty.

The above examples illustrate several embodiments of my invention using various substrates. All produce an effectively held and supported polyolefin film, with the polyolefin film readily and satisfactorily releasable or strippable when such point is required in the overall processing scheme.

As a base or substrate for the release composition of my invention, a variety of materials can be employed. Fibrous cellulosic sheet materials such as bleached paper and the like as well as papers made from pulps prepared by chemical, mechanical or chemical-mechanical processes other than the kraft process are suitable. Kraft paper is particularly suitable in general because of its overall properties, and I prefer a kraft paper with a basis of from about 25 pounds per ream upward to about 100 pounds per ream. The substrate to be used should have sufficient rigidity so that folding or wrinkling does not occur on ultimate stripping of the polyolefin coating.

While kraft-type paper is preferred, other materials can be utilized such as Holland cloth; or glassine, a super-calendered paper, whose name is derived from its particularly glossy surface, high density and transparency. Other useful substrates include polyethylene terephthalate films and other film forming polyesters, metal foil such as aluminum foil, various unplasticized or partly plasticized thermoplastic films exemplified by the various homopolymers and copolymers of vinyl chloride or fluoride, polytetrafluoroethylene, polystyrene, polyamides, cellulose acetate, and the like.

For the second or resinous layer or layers according to the compositions of my invention, I use a silicon-alkyd. Organic-alkyd resins essentially are reaction products of a glycerol, fatty acids, and phthalic anhydride. The silicones can replace some or all of the fatty acids and hence the products are termed silicone-alkyds. In modifications of such reactions, a silicone ester can be utilized in which case the silicone replaces not only some or all of the fatty acids, but also replaces some of the phthalic anhydride and so takes an active part in the polymerization by tying two of the glycerols together. The molecular size of the silicone ester may be large or small, and various groups on the basic silicone component can be utilized to alter the properties of the finished polymer. The general reactions involved in the formation of such resins are described by R. R. McGregor in Silicones and Their Uses, published by McGraw-Hill Book Company, New York City, N.Y., 1954.

Prepolymers of this type are commercially available, such as the coating composition supplied under the trademark Tufline C–73, a silicone-alkyd product supplied by the Guardian Chemical Division of the I.C.E. Corporation.

These curable silicone-alkyd resin materials normally are utilized as a solution or dispersion in such common solvents as xylene, toluene, methylethylketone, carbon tetrachloride, and the like. The solvent serves as a convenient vehicle for uniform application of the silicone-alkyd resin. Solvents of even higher-boiling character can be utilized, but require additional time and temperature for their removal, and difficulty with some of the more sensitive substrates such as described in Example III hereinabove may be encountered.

For best results, the silicone-alkyd coating is applied substantially uniformly upon the surface of the substrate by means known to the art such as roller coating and the like. The prepolymer is frequently applied to the substrate in a range of from about 1 to about 3 pounds on a dry solids basis per ream of substrate. The coating then is cured, which involves both a removal of the solvent and the cross-linking of the polymer with a suitable catalyst or curing agent. Suitable catalysts are known and include such as p-toluene sulfonic acid and the like. The resin usually is cured on the substrate at an oven temperature of from 275 to 450° F., with the range variable related to line speed and length of residence time in the oven. Multiple pass operation can be utilized, or a series of more than one oven. The temperature used not only drives off the solvents, but also helps initiate the curing of the silicone alkyd resin. The line speed utilized depends upon the ability of the oven to dry and cure the applied coating, and can range from 50 to 1,000 feet per minute.

The third or polyolefin film layer can consist of any polyolefin that can be melt processed. The process is a method of extrusion-lamination known to the art. The polyolefin can be extrusion coated onto the second layer at extrusion temperatures usually within the range of from 450° to 700° F. The amount of polyolefin coating applied to the second layer will usually be within the range of from 3 to 30 pounds per ream, preferably from 7 to 15 pounds per ream. These values apply to a single layer of polyolefin. When each side of the substrate is coated with silicone-alkyd resin, then overcoated with polyolefin, the values apply to each polyolefin coating or film.

The term polyolefin refers to the polymeric material of a 1-olefin of from 2 to 8 carbon atoms per molecule and includes copolymers thereof between two or more thereof and up to 25 weight percent of monomers commonly copolymerized therewith. While many polyolefins are suitable, the presently preferred resin is a polyethylene with densities, i.e., such as from 0.915 to 0.97 g./cc. as determined by ASTM Method D–1505–63T and a melt index in the range of from 2 to 25, as determined according to ASTM Method D–1238–62T, Condition E, with a preferred range of from 5 to 15.

Optionally, as I have indicated in describing the drawing, particularly in reference to FIG. 2, an additional coating 5 can be applied to the polyolefin layer so as to permit release from the polyolefin layer of a subassembly such as a bandage plus adhesive. This additional layer distinctly is not the same as the cured silicone-alkyd resin which has been applied to and cured on the base substrate. The optional release coatings to apply to the outer surface of the polyolefin layer are curable silicones, often called the organosiloxanes which term I have used hereinbefore. They have the general repeating structure

where R is a hydrocarbon radical and one of the R groups can be hydrogen. R can be any suiablte monovalent hydrocarbon radical such as alkyl, cycloalkyl, aryl, alkaryl, and aralkyl, or combinations thereof. Preferably, each R is selected from alkyl radicals containing from 1 to 6 carbon atoms, and phenyl. The methyl radical is very frequently employed in such compositions. In some compositions on ether linkage —O— is substituted for one of the R groups for additional cross-linking effects. These release coatings and methods of application of same are particularly described in application Ser. No. 457,849 filed May 21, 1965, by J. V. Eller et al., now abandoned.

The optional release layers further can be applied to the outer surface of the base paper or other base substrate where certain particular applications of the entire composition assembly are intended, such as where a rolling up of the entire assembly and the like is necessary for storage or shipment, particularly where the adhesive has already been applied to the outer surface of the polyolefin layer. For such release layers again an organosiloxane is useful, and the methods of preparation and application of same can be found by referring to the application mentioned in the preceding paragraph.

The strippable release composition of my invention is useful and versatile in production of many types of products, as will be observed from the foregoing discussion. In fact, any time it is desired to protect an adhesive coated structure with a polyolefin film over the adhesive, my strippable release coated composition provides a highly effective method of supporting the polyolefin film until the other materials are added thereon. My composition is one that can be readily released at the resin versus polyolefin interface, taking away the substrate and resin, leaving the polyolefin on and protecting the adhesive of the subassembly. The subassembly, including the protective polyolefin layer, can then be processed for packaging as desired.

Reasonable variations and modifications of my invention are possible within the scope of my disclosure, yet without departing from the scope and spirit thereof as discussed hereinabove.

I claim:

1. A releasably supported polyolefin film structure comprising in order:
   a backing sheet,
   a silicone-alkyd resin coating on one surface of said backing sheet and cured adherently thereto as a release coating,
   a polyolefin film on said release coating and releasable therefrom, and
   a cured organosiloxane coating on the surface of said polyolefin film furthest from said backing sheet.

2. A releasably supported polyolefin film structure in accordance with claim 1 wherein said backing sheet is paper, Holland cloth, glassine, polyester, metal foil, homopolymer or copolymer of vinyl halide, cellulose acetate, polyamide, polytetrafluoroethylene, or polystyrene.

3. A releasably supported polyolefin film structure in accordance with claim 1 wherein said polyolefin film is produced from a polymer obtained by the polymerisation of at least one olefin of from 2 to 8 carbon atoms per molecule and from 0 to about 25 percent of a monomer copolymerizable therewith, and said polyolefin has a density of from 0.91 to about 0.97.

4. A releasably supported polyolefin film structure in accordance with claim 3 wherein said silicone-alkyd resin is present on said backing sheet in an amount in the range of from about 1 to about 3 pounds of dry solids per ream of said backing sheet and wherein said silicone-alkyd is cured after application to said backing sheet.

5. A releasably supported polyolefin film structure in accordance with claim 4 wherein said polyolefin film is from about 0.25 mil to about 2 mils in thickness and is releasable from said coating with a release of from 1 to 50 grams per inch width at 180° pull-back.

6. A releasably supported polyolefin film structure in accordance with claim 5 wherein said polyolefin film is a polyethylene film, and said backing sheet is a paper.

7. A process of preparing an adhesive-coated sheet structure which comprises:
(a) applying an adhesive material to the exposed surface of a polyolefin film of a releasably supported polyolefin film structure comprising in order:
   a backing sheet,
   a silicone-alkyd resin coating on one surface of said backing sheet and cured adherently thereto as a release coating,
   a polyolefin film on said release coating and releasable therefrom,
(b) applying to said adhesive material a first material to which said adhesive material exhibits substantially greater adherence than exhibited to said film,
(c) slitting the product from step (b) to suitable sizes,
(d) removing from said slitted product said backing sheet and said release coating, and
thereby producing an adhesive-coated polyolefin film coated on one side with said adhesive material and wherein said adhesive is protected with said polyolefin film.

8. A process according to claim 7 wherein further an organosiloxane release layer is aplied to the surface of said polyolefin film furthest from said backing sheet and said organosiloxane release layer is cured prior to application of said adhesive material, and wherein said adhesive material is applied to said cured organosiloxane on said polyolefin film.

9. A process according to claim 7 wherein the adhesive-coated polyolefin film product of step (d) is a bandage, and first material in step (b) is a gauze.

References Cited
UNITED STATES PATENTS

| | | | |
|---|---|---|---|
| 2,556,078 | 6/1951 | Francis | 117—3.4 X |
| 2,768,149 | 10/1956 | Millar | 260—33.6 |
| 2,943,475 | 7/1960 | Benveniste et al. | 117—161 X |
| 3,488,304 | 1/1970 | Baugh et al. | 117—161 X |
| 3,235,395 | 2/1966 | Scharf | 117—122 X |
| 3,309,257 | 3/1967 | Borack | 161—406 X |
| 3,335,021 | 8/1967 | Morgan | 117—122 X |

WILLIAM D. MARTIN, Primary Examiner

T. G. DAVIS, Assistant Examiner

U.S. Cl. X.R.

117—4, 68, 76 F, 76 P, 161 K, 161 ZA; 156—230, 233

UNITED STATES PATENT OFFICE

CERTIFICATE OF CORRECTION

Patent No. 3,690,909                      Dated: September 12, 1972

John G. Finley

It is certified that error appears in the above-identified patent and that said Letters Patent are hereby corrected as shown below:

Column 1, line 3, after "Chicago, Ill." insert -- , assignor to --; line 4, delete "(c/o Phillips Petroleum Co., Bartlesville, Okla. 74003)" and insert -- Phillips Petroleum Company --. Column 6, line 57, delete "polymerisation" and insert -- polymerization --. Column 7, line 22, delete "aplied" and insert -- applied --. Column 8, line 6, after "and" insert -- said --.

Signed and sealed this 27th day of November 1973.

(SEAL)
Attest:

EDWARD M. FLETCHER, JR.             RENE D. TEGTMEYER
Attesting Officer                    Acting Commissioner of Patents